US009170979B2

United States Patent
Salisbury et al.

(10) Patent No.: US 9,170,979 B2
(45) Date of Patent: Oct. 27, 2015

(54) CONVERGING INTERCONNECT NODE CONTROLLING OPERATION RELATED TO ASSOCIATED FUTURE ITEM IN DEPENDENCE UPON DATA PREDICTED BASED ON CURRENT TRANSACTION DATA ITEM PASSING THROUGH

(75) Inventors: Sean James Salisbury, Appley Bridge (GB); Andrew David Tune, Dronfield (GB)

(73) Assignee: ARM Limited, Cambridge (GB)

( * ) Notice: Subject to any disclaimer, the term of this patent is extended or adjusted under 35 U.S.C. 154(b) by 856 days.

(21) Appl. No.: 13/427,943

(22) Filed: Mar. 23, 2012

(65) Prior Publication Data

US 2013/0254145 A1 Sep. 26, 2013

(51) Int. Cl.
*G06F 15/18* (2006.01)
*G06F 15/173* (2006.01)
*G06F 9/46* (2006.01)

(52) U.S. Cl.
CPC ............. *G06F 15/18* (2013.01); *G06F 9/466* (2013.01); *G06F 15/173* (2013.01); *G06F 15/17306* (2013.01); *G06F 15/17312* (2013.01)

(58) Field of Classification Search
CPC ..... H04L 47/10; H04L 49/254; H04L 47/283; H04L 47/12; H04L 47/28; H04L 47/2433; H04L 41/0823; H04L 67/32–67/325; G06F 15/173; H04W 88/04; H04W 28/14; H04W 28/10; H04W 92/12
See application file for complete search history.

(56) References Cited

U.S. PATENT DOCUMENTS

| 5,822,543 | A  | * | 10/1998 | Dunn et al. | ................... | 709/224 |
| 6,542,468 | B1 | * | 4/2003 | Hatakeyama | ................. | 370/238 |
| 2007/0208492 | A1 | * | 9/2007 | Downs et al. | ................. | 701/117 |
| 2009/0070550 | A1 |   | 3/2009 | Solomon |  |  |

FOREIGN PATENT DOCUMENTS

EP 2 280 513 2/2011

OTHER PUBLICATIONS

E. Kakoulli et al, "Intelligent Hotspot Prediction for Network-on-Chip-Based Multicore Systems" *IEEE Transactions on Computer-Aided Design of Integrated Circuits and Systems*, vol. 31, No. 3, Mar. 2012, pp. 418-431.

(Continued)

*Primary Examiner* — Kenneth Kim
(74) *Attorney, Agent, or Firm* — Nixon & Vanderhye P.C.

(57) ABSTRACT

An integrated circuit includes one or more transaction data sources and one or more transaction data destinations connected via interconnect circuitry comprising a plurality of interconnect nodes. Within the interconnect nodes there are one or more converging interconnect nodes. A converging interconnect node includes prediction data generation circuitry for reading characteristics of a current item of transaction data from the converging interconnect node and generating associated prediction data for a future item of transaction data which will be returned to the converging interconnect node at a predetermined time in the future. This prediction data is stored within prediction data storage circuitry and is read by prediction data evaluation circuitry to control processing of a future item of transaction data corresponding to that prediction data when it is returned to the converging interconnect node. The interconnect circuitry may have a branching network topology or recirculating ring based topology.

20 Claims, 7 Drawing Sheets

(56) References Cited

OTHER PUBLICATIONS

H. Matsutani et al, "Prediction Router: A Low-Latency On-Chip Router Architecture with Multiple Predictors" *IEEE Transactions on Computers*, vol. 60, No. 6, Jun. 2011, pp. 783-799.

ARM Limited, "PrimeCell® AXI Configurable Interconnect (PL300)" Revision: r0pl, Technical Reference Manual, 2004, 60 pages.

Oracle, "Oracle® Tuxedo Mainframe Adapter for OSI TP" User Guide, Release 11 gR1, Aug. 2010, 170 pages.

International Search Report and Written Opinion mailed May 7, 2013 in PCT/GB2013/050331.

International Preliminary Report on Patentability dated Oct. 2, 2014 in PCT/GB2013/050331, 6 pages.

* cited by examiner

| Respin | Priority | Burst Length | ⎫ |
|--------|----------|--------------|---|
| Respin | Priority | Burst Length | ⎬ timing indicated by storage location |
| Respin | Priority | Burst Length | ⎭ |

FIG. 3

CONVERGING INTERCONNECT NODE CONTROLLING OPERATION RELATED TO ASSOCIATED FUTURE ITEM IN DEPENDENCE UPON DATA PREDICTED BASED ON CURRENT TRANSACTION DATA ITEM PASSING THROUGH

BACKGROUND OF THE INVENTION

1. Field of the Invention

This invention relates to the field of integrated circuits. More particularly, this invention relates to the control of a converging interconnect node within interconnect circuitry comprising a plurality of interconnect nodes serving to connect one or more transaction data sources to one or more transaction data destinations.

2. Description of the Prior Art

It is known to provide integrated circuits with interconnect circuitry for transferring transaction data between one or more transaction data sources and one or more transaction data destinations. Such interconnect circuitry can comprise a plurality of interconnect nodes between which transaction data is transferred. The interconnect nodes can be arranged in a variety of different topologies. One example topology is that of a branching arrangement of interconnect nodes with transaction data sources and transaction data destinations disposed at the end points of data paths passing through the branching network. Another example form of interconnect topology is ring interconnect circuitry in which interconnect nodes are disposed in a ring around which transaction data circulates. Transaction data is extracted from the ring or injected into the ring at interconnect nodes disposed at different positions around the ring. More than one ring may be provided, such as embodiments having two counter-rotating rings.

Within the various different forms of interconnect circuitry topology there exist converging interconnect nodes at which two or more data paths meet. Such converging interconnect nodes are potential traffic bottlenecks which can impede system performance. Measures which can increase the efficiency of data throughput within interconnect circuitry are desirable.

SUMMARY OF THE INVENTION

Viewed from one aspect the present invention provides an integrated circuit comprising:

one or more transactions data sources;

one or more transaction data destinations; and interconnect circuitry coupled to said one or more transactions data sources and said one or more transaction data destinations and configured to transfer transaction data between said one or transaction data sources and said one or more transaction data destinations; wherein said interconnect circuitry comprises a plurality of interconnect nodes and said interconnect circuitry is configured to transfer transaction data between said interconnect nodes along a plurality of data paths between said one or more transaction data sources and said one or more transaction data destinations; and at least one of said plurality of interconnect nodes is a converging interconnect node disposed at a point of convergence between two or more of said plurality of data paths, said converging interconnect node comprising:

(i) prediction data generation circuitry configured to generate prediction data based upon a current item of transaction data passing through said converging interconnect node, said prediction data including at least data indicative of a prediction of a time when future item of transaction data associated with said current item of transaction data will arrive at said converging interconnect node;

(ii) prediction data storage circuitry coupled to said prediction data generation circuitry and configured to store said prediction data; and (iii) prediction data evaluation circuitry coupled to said prediction data storage circuitry and configured to control behaviour of said converging interconnect node in dependence upon said prediction data.

The present technique provides for prediction data generation, prediction data storage and prediction data evaluation at a converging interconnect node to enable improved control of that converging interconnect node in a manner which may improve efficiency. Prediction data may be generated in response to data transactions passing through the converging interconnect mode as such data transactions are likely to be correlated with future transactions. The correlation at a basic level may be that of the time at which a future transaction related to the current transaction will return to the converging interconnect node can be predicted and this prediction used to manage contention with other data transactions sharing that converging interconnect node.

Other characteristics of the current transaction data may also be read and used to generate prediction data. Such as prediction data that can be used to set up or reserve resources within the converging interconnect node or elsewhere that will improve the efficiency with which a future transaction associated with the current transaction may be handled.

The present technique exploits the realisation that the topology of the interconnect circuitry is typically fixed and accordingly the timing relationships between current transactions and associated future transactions can be reliably predicted. Devolving such prediction and management tasks to the converging interconnect nodes simplifies the implementation and focuses the improved control at the points within the interconnect circuitry that typically give rise to processing bottlenecks due to undesirable transaction contention.

The prediction data storage circuitry may comprise a plurality of storage locations with each storage location being associated with a prediction of a time at which the future item of transaction data associated with the current item of transaction data will arrive at the converging interconnect node. Thus, the predicted time information may be encoded using the storage location of the prediction data as a marker for the predicted time of arrival of the future item of transaction data. It would also be possible in other embodiments to separately and explicitly encode the predicted time of arrival of the future item of transaction data desired.

The plurality of storage locations within the prediction data storage circuitry may be divided into a plurality of storage portions with each of these storage portions being associated with a respective data path that converges at the converging interconnect node. Thus, prediction data for different data paths may be partitioned between different portions of the storage. The different portions of the storage contain prediction data which is modelling a predicted future behaviour of the associated data path that will return future transactions to the converging interconnecting node.

In some embodiments, each of the plurality of storage portions may include a storage location for each period during which one of a current item of transaction data or a future item of transaction data will be held at one of the plurality of interconnect nodes while propagating along a data path between the converging interconnect node and a data destination associated with the current item of transaction data both on its outbound and return journey between the converging interconnect node and the data destination. Interconnect circuitry is typically clocked such that transaction data moves in synchronism between different interconnect nodes which separately register (store) the transaction data before moving that transaction data to the next interconnect node, subject to appropriate routing, during the next period.

As previously mentioned, the interconnect circuitry may have a variety of different topologies. One example topology in which the present technique may be used is when the plurality of interconnect nodes are connected to form a branching network of interconnect nodes. Such a branching network may be considered to be an "ad hoc" topology which can be custom designed for a particular combination of transaction sources and transaction destinations within an integrated circuit being implemented. Such an interconnect topology is typically employed with system-on-chip integrated circuits. As previously mentioned, within the context of such a branching network of interconnect nodes, the plurality of storage locations may include an interconnect propagation storage location associated with each period corresponding to an interconnect node in an outbound portion of the data path and separately for that interconnect node when serving as part of the inbound portion of the data path back to the converging interconnect node.

It will also be appreciated that the data destination will have its own latency in processing transaction data and this latency will have an effect upon the arrival time of the future item of transaction data which is being predicted. In order to model this destination latency, each of the plurality of storage portions may include one or more destination latency storage locations associated with a period corresponding to a latency of the data destination concerned in generating the future item of transaction data to be returned to the converging interconnect node along the inbound portion of the data path back to the converging interconnect node.

The number of destination latency storage locations may be configurable in dependence upon the nature of the transaction. This configurable number may be determined when the interconnect is designed, dynamically through the use of training data at the start of data operation, or dynamically during operation in dependence upon observed behaviour and whether or not predicted return times are accurate.

The plurality of storage portions may be conveniently implemented as a ring buffer having a write pointer indicating a storage location to which prediction data associated with a current item of transaction data is to be written and a read pointer indicating a storage location from which prediction data associated with an item of transaction data returning to the converging interconnect node should be read.

The prediction data itself can take a wide variety of different forms. Examples of the type of prediction data which may be useful include data indicative of a priority level associated with the future item of transaction data, data indicative of a data quantity associated with the future item of transaction data and/or data indicative of processing already applied to the current item of transaction data at the converging interconnect node as it first arrived at that converging interconnect node.

Another possible topology for the interconnect circuitry is that of ring interconnect circuitry configured such that transaction data circulates around the ring interconnect circuitry along a plurality of rings of interconnected nodes each forming a ring data path. In this context, the data indicative of processing of the current item of transaction data at the converging data node may include data indicating that the current item of transaction data was recirculated around the ring interconnect circuitry rather than being extracted from the ring interconnect circuitry at the converging interconnect node due to contention with another item of transaction data arriving at the converging interconnect node on a different data path at a time contending with the current item of transaction data. The prediction data can thus mark a transaction as a "respin" transaction which has lost in a contention with another transaction upon a previous pass of the converging interconnect node. This prediction data can be used to increase the likelihood that the transaction data concerned will be extracted at its next pass of the converging interconnect node, i.e. the data will serve as a prediction of a higher likelihood of extraction on a following pass.

It will be appreciated that the ring interconnect circuitry can comprise a variety of different numbers of rings. Some efficient embodiments comprise a pair of rings around which transaction data circulates in opposite directions. The prediction data for a current item of transaction data indicating that it has been recirculated may be used to force extraction of that item of transaction data from the ring interconnect circuitry upon a next pass of the converging interconnect node.

Within the context of ring interconnect circuitry having counter-rotating rings with each node forming part of each of the two rings, then each node will be a converging interconnect node which can benefit from the above described techniques.

The prediction data evaluation circuitry may be configured to look ahead within the prediction data to evaluate prediction data for a future item of transaction data that has yet to reach the converging interconnect node. This look ahead can trigger one or more set up operations with that future item of transaction data which will improve the efficiency with which that future item of transaction data may be processed when it does reach the converging node.

Examples of the one or more setup operations that may be performed include allocating buffer storage for use in association with a future item of transaction data yet to reach a converging interconnect node and altering a priority level associated with an earlier item of transaction data that will reach the converging interconnect node prior to the future item of transaction data yet to reach the converging interconnect node such that the earlier item of transaction data will not stall progress through the interconnect circuitry of the later arriving transaction data (e.g. there will not be a priority inversion with a high priority transaction being stalled behind a lower priority transaction).

Other uses of the prediction data by the prediction evaluation circuitry may be to control routing of transactions through the interconnect circuitry in dependence upon prediction data. Thus, if prediction data indicates that a converging interconnect node will be busy at a particular future period, then the routing of a current item of transaction data may be adjusted so as to avoid contention with that predicted busy period.

Further examples of the use of the prediction data by the prediction evaluation circuitry include controlling at least one of clock frequency and power supply voltage of a data destination in dependence upon prediction data. Thus, if prediction data indicates that a data destination will be required to perform some processing within a given period of time, then the clock frequency and voltage of that data destination may be controlled so that it is able to more efficiently perform the predicted desired future processing.

Viewed from another aspect the present invention provides an integrated circuit comprising:

one or more transactions data source means for initiating data transactions;

one or more transaction data destination means for responding to data transactions; and interconnect means, coupled to said one or more transactions data source means and said one or more transaction data destination means, for transferring transaction data between said one or transaction data source means and said one or more transaction data destination means; wherein said interconnect means comprises a plurality of interconnect node means for communicating data transactions and said interconnect means is configured to transfer transaction data between said interconnect node means along a plurality of data paths between said one or more transaction data source means and said one or more transaction data destination means; and at least one of said plurality of interconnect node means is a converging interconnect node means disposed at a point of convergence between two or more of said plurality of data paths, said converging interconnect node means comprising:
(i) prediction data generation means for generating prediction data based upon a current item of transaction data passing through said converging interconnect node means, said prediction data including at least data indicative of a prediction of a time when future item of transaction data associated with said current item of transaction data will arrive at said converging interconnect node means;
(ii) prediction data storage means, coupled to said prediction data generation means, for storing said prediction data; and
(iii) prediction data evaluation means, coupled to said prediction data storage means, for controlling behaviour of said converging interconnect node means in dependence upon said prediction data.

Viewed from a further aspect the present invention provides an integrated circuit comprising:

initiating data transactions with one or more transactions data sources;

responding to data transactions with one or more transaction data destinations;

transferring transaction data between said one or transaction data sources and said one or more transaction data destinations via a plurality of interconnect nodes along a plurality of data paths between said one or more transaction data sources and said one or more transaction data destinations, wherein at least one of said plurality of interconnect nodes is a converging interconnect node disposed at a point of convergence between two or more of said plurality of data paths, said method further comprising said converging interconnect node performing the steps of:
(i) generating prediction data based upon a current item of transaction data passing through said converging interconnect node, said prediction data including at least data indicative of a prediction of a time when future item of transaction data associated with said current item of transaction data will arrive at said converging interconnect node;
(ii) storing said prediction data; and
(iii) controlling behaviour of said converging interconnect node in dependence upon said prediction data.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 schematically illustrates example prediction data;

DESCRIPTION OF THE EMBODIMENTS

Figure 1:
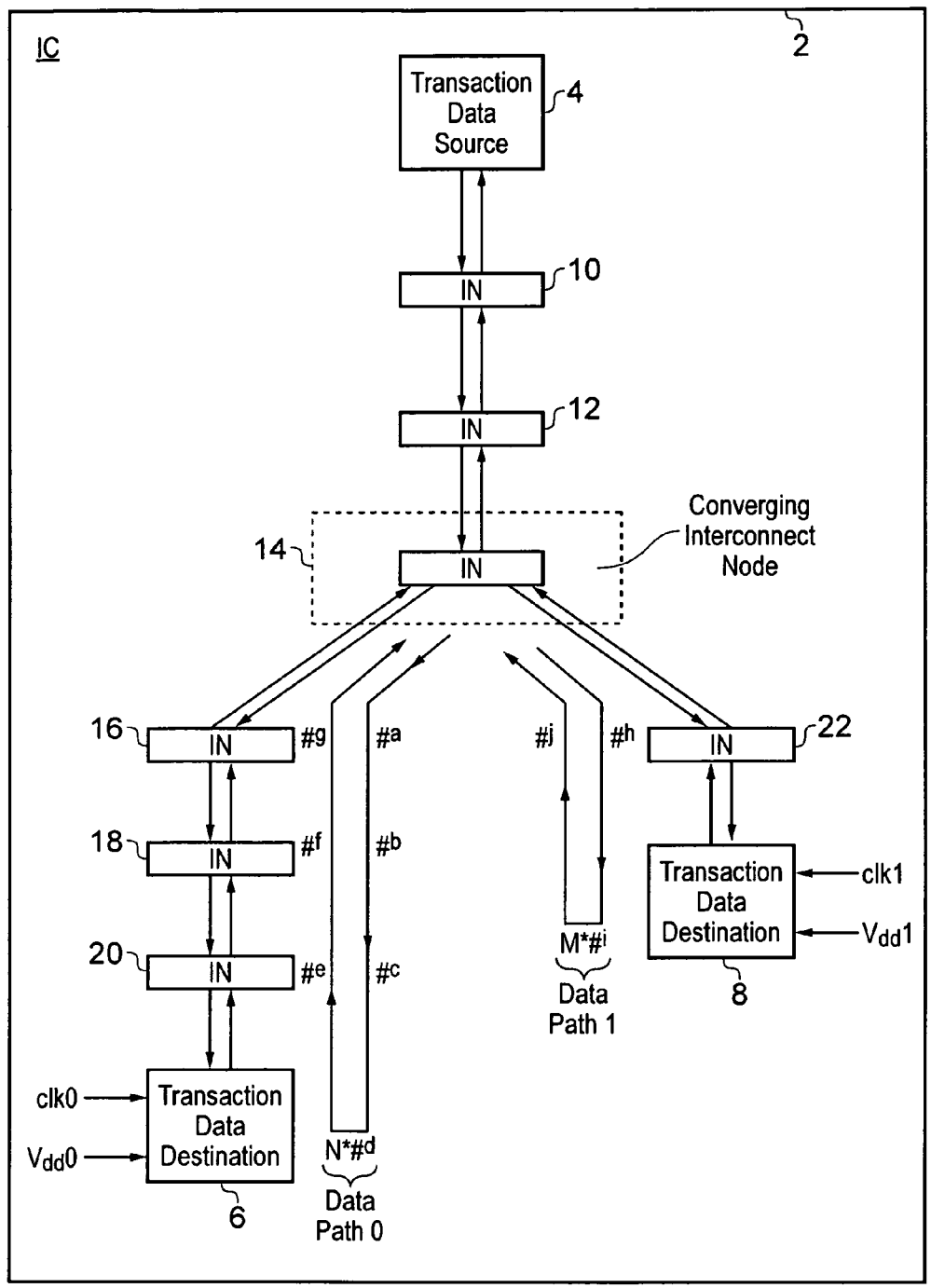
FIG. 1 schematically illustrates an integrated circuit including interconnect circuitry.

FIG. 1 schematically illustrates an integrated circuit 2 including a transaction data source 4 and two transaction data destinations 6, 8. It will be appreciated that typically many more transaction data sources and transaction data destinations will be provided within a typical system-on-chip integrated circuit and the interconnect topology will be considerably more complex than that illustrated in FIG. 1. The interconnect circuitry of the example of FIG. 1 comprises a plurality of interconnect nodes 10, 12, 14, 16, 18, 20, 22. The interconnect node 14 is a converging interconnect node as two data paths converge at this converging interconnect node 14. The first data paths is the outbound and inbound paths through interconnect nodes 16, 18, 20 to transaction data destination 6 and back through interconnect nodes 20, 18, 16. The second data path is outbound through interconnect node 22 to transaction data destination 8 and then back inbound through interconnect node 22 to the converging interconnect node 14. These data paths have different lengths. Furthermore, the latency of the two data destinations 6, 8 differs with transaction data destination 6 taking one period to perform its processing whereas the transaction data destination 8 takes two such periods in the present example.

As transaction data arrives at the converging interconnect node 14 from the transaction data source 4 it is read and routed along the appropriate one of the two data paths to either the transaction data destination 6 or the transaction data destination 8. Prediction data associated with that transaction is stored within prediction data storage circuitry of the converging interconnect node 14. This prediction data storage circuitry may be divided into two portions, with a first portion responsible for storing the prediction data for the data path through interconnect nodes 16, 18, 20 and for the transaction data destination 6 and a second portion responsible for storing prediction data through the interconnect node 22 to the transaction data destination 8.

Figure 2:
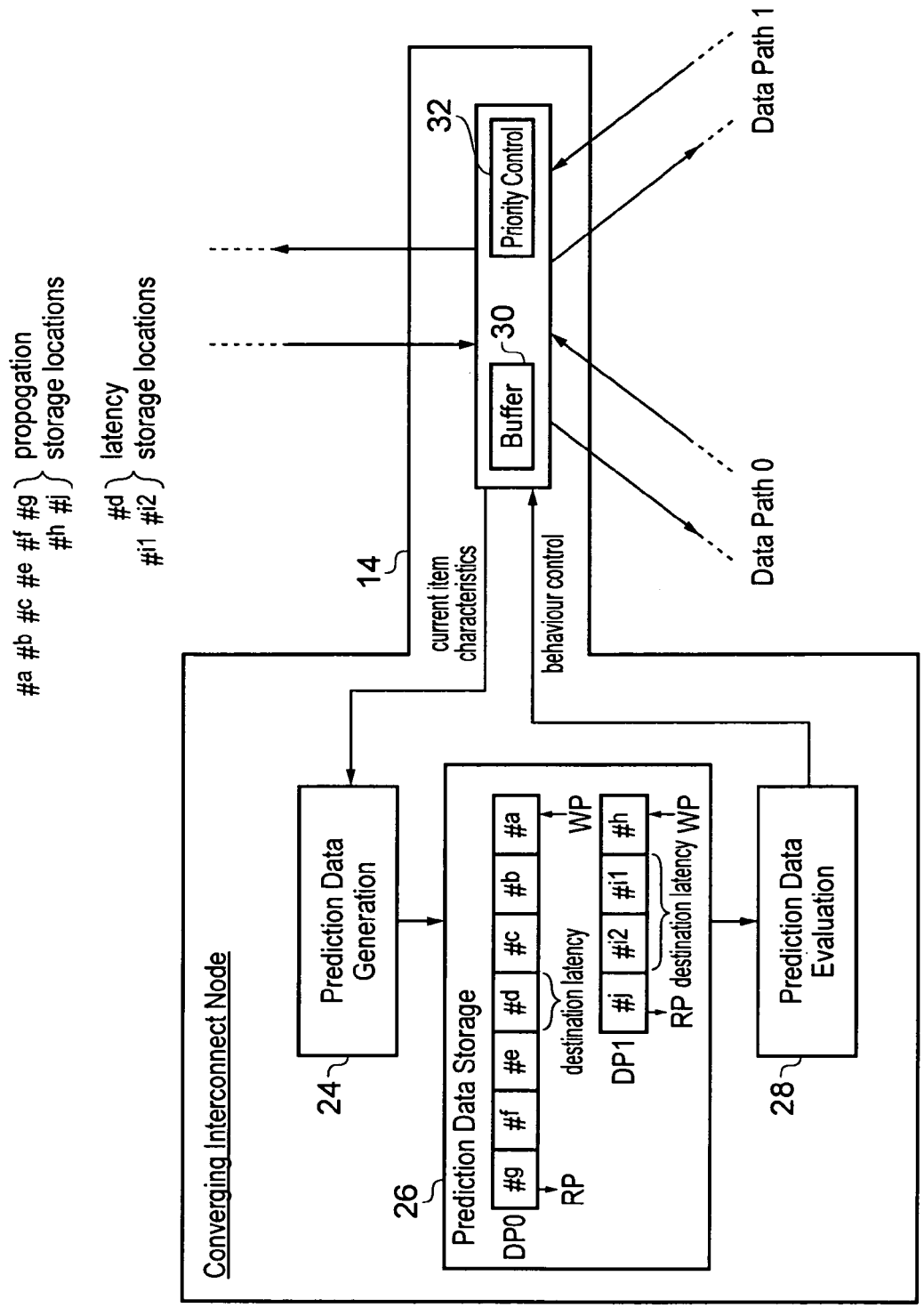
FIG. 2 schematically illustrates a converging interconnect node.

FIG. 2 schematically illustrates a converging interconnect node 14 in more detail. The converging interconnect node includes prediction data generation circuitry 24, prediction data storage circuitry 26 and prediction data evaluation circuitry 28. The prediction data generation circuitry 24 reads characteristics of current items of transaction data passing through the converging interconnect node 14 and uses these to generate prediction data. This prediction data may be as simple as noting when an associated future item of transaction data corresponding to that current item of transaction data will be returned to the converging interconnect node 14. Further items of prediction data may include a priority level associated with the current transaction, a data quantity (e.g. a burst length) associated with the current item and, in ring interconnect embodiments, a flag indicating that a current item has been respun through the interconnect rather than being extracted at a current pass, or a flag indicating that a current item has been stalled due to contention with another item of transaction data.

The prediction data storage circuitry 26 includes two portions of prediction data storage locations. One portion of prediction data portion of prediction data storage locations is associated with the first data path through interconnect nodes 16, 18, 20 to transaction data destination 6 while the other portion of storage locations is responsible for storing prediction data associated with the interconnect node 20 and the transaction data destination 18. The prediction data associated with these different storage locations and the corresponding mapping to the positions within the data path is noted by the use of common # markers in FIG. 1 and FIG. 2.

Each of the portions of storage locations is arranged as a ring buffer with an associated write pointer WP and read pointer RP. The write pointer WP is used to direct prediction data to be stored at a particular storage location in respect of a current item of transaction data. The read pointer RP is used to indicate a storage location corresponding to a future item of transaction data that is just being returned to the converging interconnect node 14. The read pointer RP in the example illustrated in FIG. 2 corresponds to the future item of transaction data being currently being returned to the converging interconnect node 14. However, it is possible for the read pointer RP to be used to look ahead within the prediction data in respect of future items of transaction data which have yet to be returned to the converging interconnect node 14 and respond to such prediction data read in a look ahead to perform setup operations associated with the yet to be received future items of transaction data.

The setup operations may include the allocation of storage locations within a buffer 30 of the converging interconnect node 14. Other setup operations may involve priority control circuitry 32 which may adjust the priority of one or more data transactions received at the converging interconnect node 14 on the return path prior to the future item of transaction data for which the look ahead read has just been made. Such priority adjustment may be made, for example, to stall a preceding item of transaction data based upon the prediction that a higher priority item of transaction data will soon follow it so as to avoid that higher priority item of priority data being inappropriate stalled behind the lower priority item of transaction data in a manner corresponding to a priority inversion.

It will be appreciated that the prediction data could take a wide variety of different forms and the above are only some examples of the form of prediction data that may be stored and the use to which such prediction data may be put.

The different portions of storage locations within the prediction data storage circuitry 26 may be divided into propagation storage locations and latency storage locations. The propagation storage locations correspond to data periods during which a corresponding transaction is propagating along between interconnect nodes whereas latency storage locations correspond to periods of time during which the transaction is being processed by the data destination. All of these periods are modelled such that the return time of a future item of transaction data back to the converging interconnect node 14 can be predicted.

FIG. 3 shows examples of prediction data which may be stored within the prediction data storage circuitry 26. This prediction data may include priority indicating data, data quantity indicating data (e.g. burst length) and data indicating whether an item of transaction data has been respun within a ring interconnect topology. Many other forms of prediction data may also be stored and used to control the processing performed by the converging interconnect node 14 as well as associated other circuits.

Figure 4:
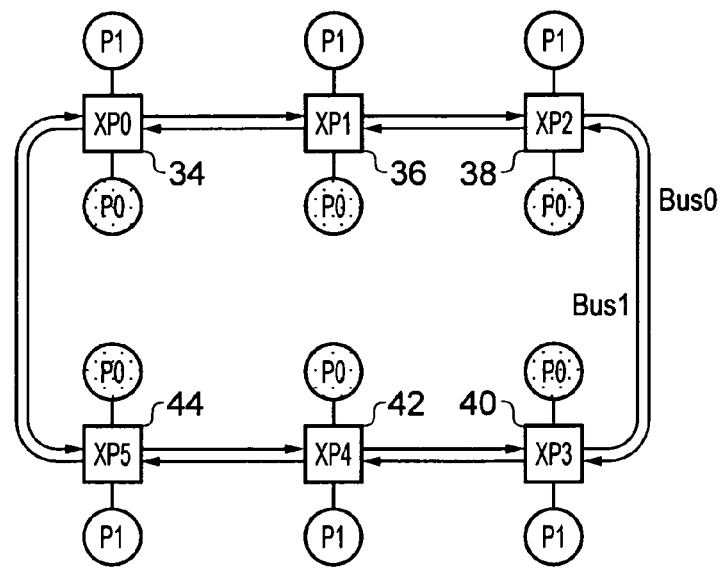
FIG. 4 schematically illustrates interconnect circuitry having a ring topology.

FIG. 4 schematically illustrates a ring interconnect topology comprising counter-rotating data paths Bus0 and Bus1. Interconnect nodes 34, 36, 38, 40, 42 and 44 are disposed around the data paths and serve as extraction and insertion points for data transactions from and to the data paths. Each of the nodes 34 to 44 is a converging interconnect node as both of the data paths pass through each of these nodes. If contention arises at an interconnect node within this embodiment, then the interconnect node will select one of the transactions to be extracted during a given period. The other transaction will be respun around the interconnect. The prediction data stored will indicate that the transaction concerned has been respun. This prediction data can be used at the next time that transaction reaches its extraction interconnect node to force extraction of that transaction even if it again contends with another transaction received during the same period at the interconnect node concerned.

Figure 5:
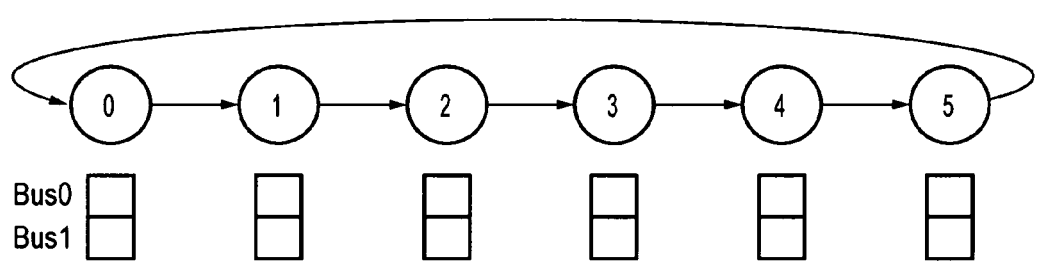
FIG. 5 schematically illustrates a data path through the interconnect of FIG. 4 and associated prediction data storage locations.

FIG. 5 schematically illustrates the topology of the interconnect of FIG. 4. The interconnect nodes are connected in a ring between which transactions are passed. FIG. 5 also indicates that the storage locations associated with prediction data to be stored at each interconnect node modelling the transactions held in the other interconnect nodes currently known to the interconnect node holding that prediction data. It will be appreciated that the prediction data will not be complete as injection of transactions on to the interconnect can occur at any node and a given interconnect node will only be aware of transactions which it has already seen and which have already passed it at least once.

Figure 6:
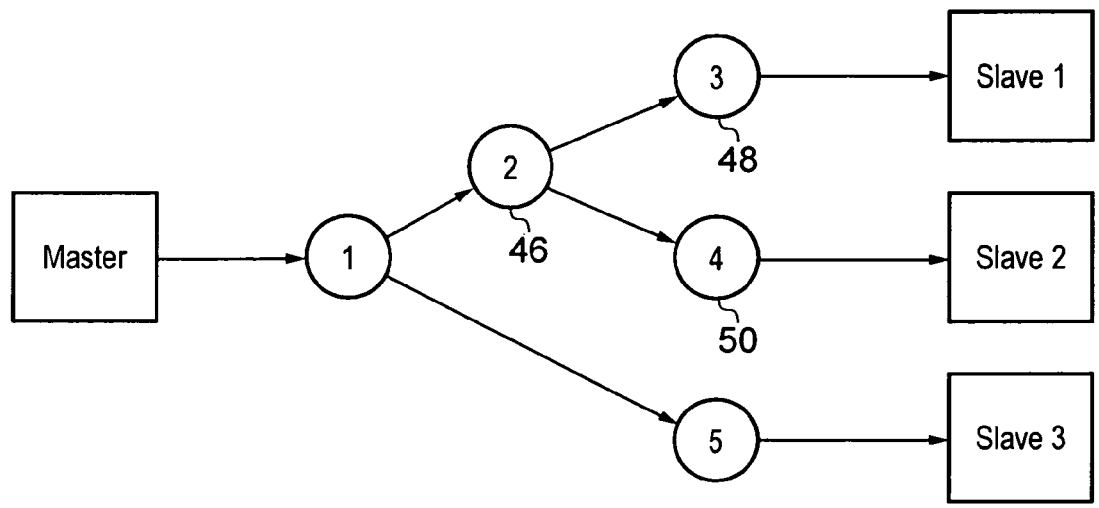
FIG. 6 schematically illustrates a branching interconnect topology.

FIG. 6 schematically illustrates interconnect circuitry comprising a plurality of interconnect nodes in a branching network arrangement. In this example there is a single master serving as a data source and three slaves serving as data destinations. Considering the interconnect node 46, this is a converging interconnect node at which respective data paths via interconnect node 48 to Slave 1 and data path through interconnect node 50 to Slave 2 meet.

Figure 7:
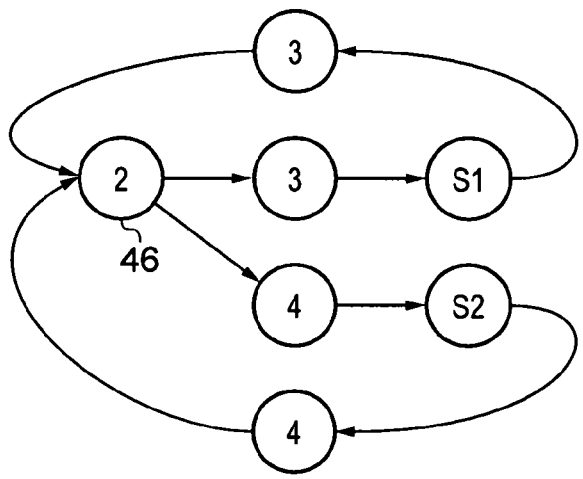
FIG. 7 schematically illustrates data paths through the branching interconnect topology of FIG. 6.

FIG. 7 schematically illustrates the two data paths which converge at converging interconnect node 46. FIG. 7 illustrates both the outbound and the return periods for a data transaction traversing the respective data path as well as the latency period at which the data transaction is processed within the slave. In the example of FIG. 7, both slaves consume a single period for the latency of their transaction.

Figure 8:
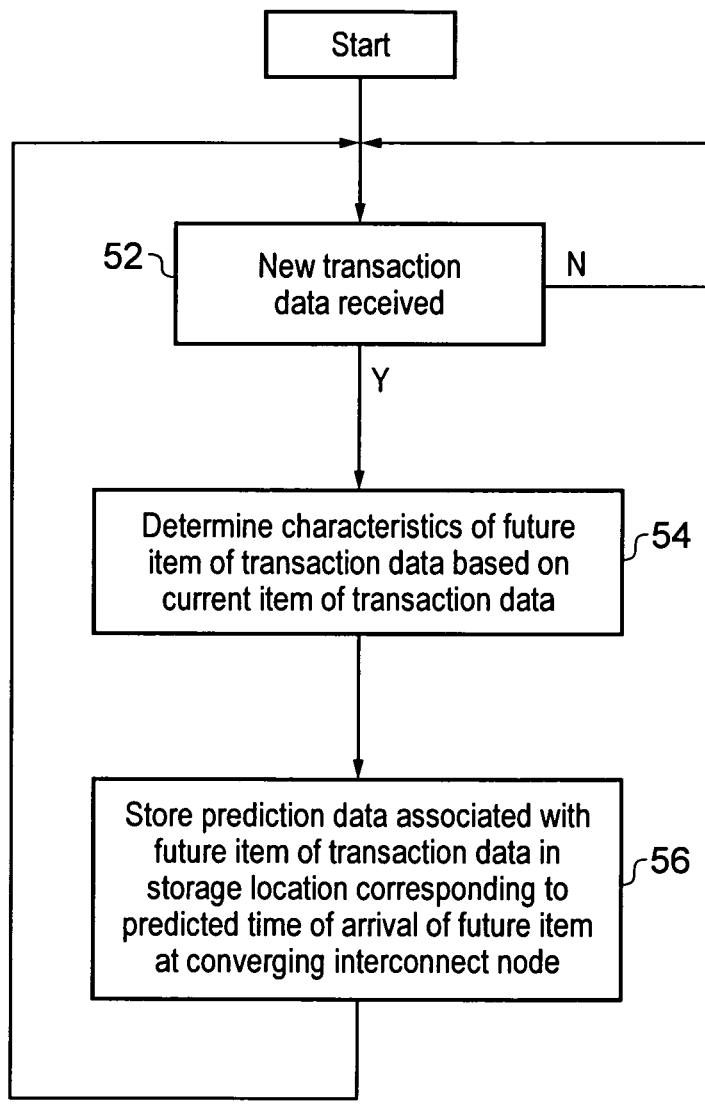
FIG. 8 is a flow diagram schematically illustrating prediction data generation.

FIG. 8 is a flow diagram schematically illustrating prediction data generation. At step 52 processing waits until a new transaction is received at the converging interconnect node. At step 54 the current transaction is evaluated and this evaluation is used to determine characteristics of a future item of transaction data. At step 56 the prediction data generated at step 54 is stored within prediction data storage circuitry 26 in a storage location corresponding to a predicted time of arrival of the future item of transaction data corresponding to the current item of transaction data back at the converging interconnect node. Processing then returns to step 52.

Figure 9:
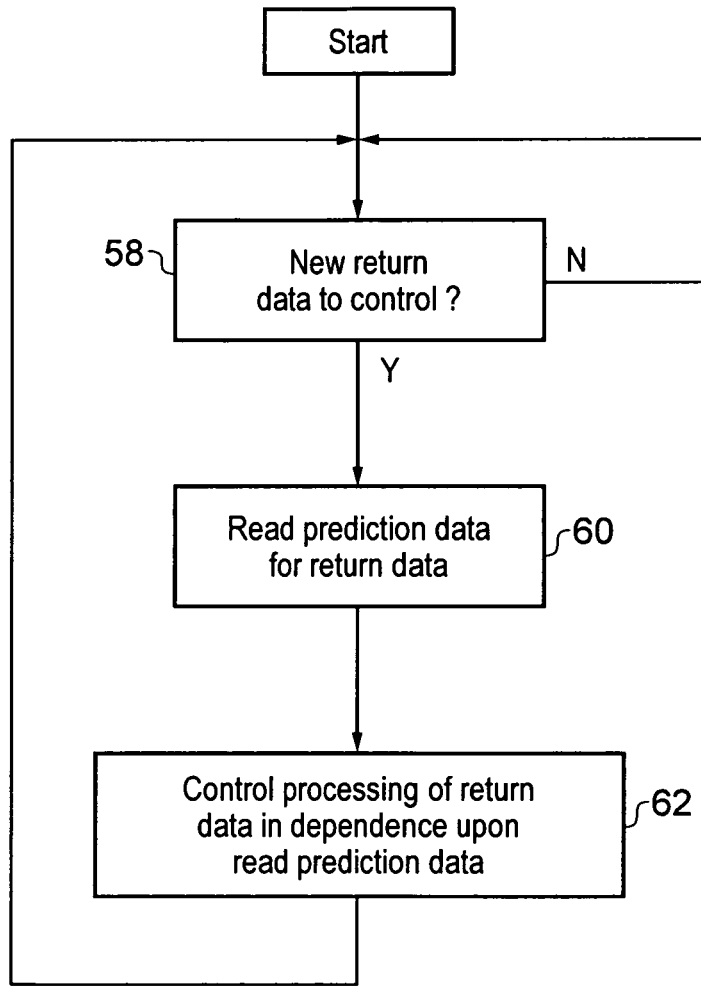
FIG. 9 is a flow diagram schematically illustrating prediction data use.

FIG. 9 is a flow diagram schematically illustrating prediction data usage. At step 58 processing waits until there is a new item of returned transaction data to be controlled. At step 60 the prediction data associated with that newly returned item is read from the prediction data storage circuitry 26. This prediction data may be data for the returned item itself or look ahead data for following returned transaction data which may nevertheless influence how the currently returned item of transaction data is to be processed. At step 62 processing of the returned data item is controlled in dependence upon the read prediction data. Processing is then returned to step 58.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An integrated circuit comprising:
   one or more transactions data sources;
   one or more transaction data destinations; and
   interconnect circuitry coupled to said one or more transactions data sources and said one or more transaction data destinations and configured to transfer transaction data between said one or transaction data sources and said one or more transaction data destinations; wherein
   said interconnect circuitry comprises a plurality of interconnect nodes and said interconnect circuitry is configured to transfer transaction data between said interconnect nodes along a plurality of data paths between said one or more transaction data sources and said one or more transaction data destinations; and
   at least one of said plurality of interconnect nodes is a converging interconnect node disposed at a point of convergence between two or more of said plurality of data paths, said converging interconnect node comprising:
   prediction data generation circuitry configured to generate prediction data based upon a current item of transaction data passing through said converging interconnect node, said prediction data including at least data indicative of a prediction of a time when a future item of transaction data associated with said current item of transaction data will arrive at said converging interconnect node;
   prediction data storage circuitry coupled to said prediction data generation circuitry and configured to store said prediction data; and
   prediction data evaluation circuitry coupled to said prediction data storage circuitry and configured to control operation of said converging interconnect node in dependence upon said prediction data with respect to the future item.

2. An integrated circuit as claimed in claim 1, wherein said prediction data storage circuitry comprises a plurality of storage locations, each storage location being associated with said prediction of a time when said future item of transaction data associated with said current item of transaction data will arrive at said converging interconnect node.

3. An integrated circuit as claimed in claim 1, wherein said prediction data storage circuitry includes a plurality of storage portions, each of said plurality of storage portions being associated with one of said two or more of said plurality of data paths that converge at said converging interconnect node.

4. An integrated circuit as claimed in claim 3, wherein each of said plurality of storage portions includes a storage location for each period during which one of said current item of transaction data and said future item of transaction data will be held at one of said plurality of interconnect nodes while propagating along a data path between said converging interconnect node and a data destination associated with said current item of transaction data.

5. An integrated circuit as claimed in claim 4, wherein said interconnect circuitry comprises a plurality of interconnect nodes connected to form a branching network of interconnect nodes.

6. An integrated circuit as claimed in claim 5, wherein each of said plurality of storage portions includes an interconnect propagation storage location for each period corresponding to an interconnect node in an outbound portion of said data path between said converging interconnect node and said data destination and separately an interconnect propagation storage location for each period corresponding to said interconnect node in an inbound portion of said data path between said converging interconnect node and said data destination.

7. An integrated circuit as claimed in claim 6, wherein said each of said plurality of storage portions includes one or more destination latency storage locations for a period corresponding to a latency of said data destination in generating said future item of transaction data from said current item of transaction data.

8. An integrated circuit as claimed in claim 7, wherein a configurable number of destination latency storage locations is provided so as to model different latency amounts of said data destination.

9. An integrated circuit as claimed in claim 3, wherein each of said plurality of storage portions comprises a ring buffer having a write pointer indicating a storage location within said ring buffer for storing prediction data associated with said current item of transaction data and a read pointer indicating a storage location within said ring buffer for storing prediction data associated with an item of transaction data returning to said converging interconnect node.

10. An integrated circuit as claimed in claim 1, wherein said prediction data further comprises one or more of:
    data indicative of a prediction of a priority level associated with said future item of transaction data;
    data indicative of a prediction of a data quantity associated with said future item of transaction data; and
    data indicative of processing of said current item of transaction data at said converging interconnect node.

11. An integrated circuit as claimed in claim 10, wherein said interconnect circuitry is ring interconnect circuitry configured such that transaction data circulates around said ring interconnect circuitry along a plurality of rings of interconnect nodes each forming a ring data path and said data indicative of processing of said current item of transaction data at said converging data node includes data indicating that said current item of transaction data was recirculated around said ring interconnect circuitry rather than being extracted from said ring interconnect circuitry at said converging interconnect node due to contention with another item of transaction data arriving at said converging interconnect node on a different data path at a time contending with said current item of transaction data.

12. An integrated circuit as claimed in claim 11, wherein said plurality of rings comprises a pair of rings around which transaction data circulates in opposite directions.

13. An integrated circuit as claimed in claim 11, wherein said prediction data for said current item of transaction data that was recirculated triggers said prediction data evaluation circuitry to force extraction from said ring interconnect circuitry upon a next pass of said converging interconnect node of said current item of transaction data that was recirculated.

14. An integrated circuit as claimed in claim 11, wherein each interconnect node within said ring interconnect circuitry is a converging interconnect node where a plurality of ring data paths meet.

15. An integrated circuit as claimed in claim 1, wherein said prediction data evaluation circuitry is configured to look ahead within said prediction data at prediction data associated with a future item of transaction data yet to reach said converging interconnect node and to trigger one or more setup operations associated with said future item of transaction data yet to reach said converging interconnect node.

16. An integrated circuit as claimed in claim 15, wherein said one or more setup operations include one or more of:
   allocating buffer storage for use in association with said future item of transaction data yet to reach said converging interconnect circuitry;
   altering a priority level associated with an earlier item of transaction data that will reach said converging interconnect node prior to said future item of transaction data yet to reach said converging interconnect node such that said earlier item of transaction data will prevent progress through said interconnect circuitry of said future item of transaction data yet to reach said converging interconnect node from being stalled.

17. An integrated circuit as claimed in claim 1, wherein said prediction evaluation circuitry controls routing of transactions through said interconnect circuitry in dependence upon said prediction data.

18. An integrated circuit as claimed in claim 1, wherein said prediction evaluation circuitry controls at least one of clock frequency and power supply voltage of a data destination in dependence upon said prediction data.

19. An interconnect node comprising:
   a converging interconnect node configured to be disposed at a point of convergence between two or more of a plurality of data paths between one or more transaction data sources for initiating data transactions and one or more transaction data destinations for responding to data transactions, said converging interconnect node comprising:
   (i) prediction data generation means for generating prediction data based upon a current item of transaction data passing through said converging interconnect node means, said prediction data including at least data indicative of a prediction of a time when a future item of transaction data associated with said current item of transaction data will arrive at said converging interconnect node means;
   (ii) prediction data storage means, coupled to said prediction data generation means, for storing said prediction data; and
   (iii) prediction data evaluation means, coupled to said prediction data storage means, for controlling operation of said converging interconnect node means in dependence upon said prediction data with respect to the future item.

20. A method comprising:
initiating data transactions with one or more transactions data sources;
responding to data transactions with one or more transaction data destinations;
transferring transaction data between said one or transaction data sources and said one or more transaction data destinations via a plurality of interconnect nodes along a plurality of data paths between said one or more transaction data sources and said one or more transaction data destinations, wherein
at least one of said plurality of interconnect nodes is a converging interconnect node disposed at a point of convergence between two or more of said plurality of data paths, said method further comprising said converging interconnect node performing the steps of:
generating prediction data based upon a current item of transaction data passing through said converging interconnect node, said prediction data including at least data indicative of a prediction of a time when a future item of transaction data associated with said current item of transaction data will arrive at said converging interconnect node;
storing said prediction data; and
controlling operation of said converging interconnect node in dependence upon said prediction data with respect to the future item.

* * * * *